Patented May 9, 1950

2,506,571

UNITED STATES PATENT OFFICE 2,506,571

ACETALS FROM ACRYLONITRILE, CARBON MONOXIDE, HYDROGEN, AND ALCOHOLS

Paul Latrell Barrick, Wilmington, and Albert Alan Pavlic, Claymont, Del., assignors to E. I. du Pont de Nemours & Company, Wilmington, Del., a corporation of Delaware No Drawing. Application August 10, 1948, Serial No. 43,537

6 Claims. (Cl. 260—465.6)

This invention relates to the synthesis of cyanopropionaldehyde acetals.

No satisfactory method has yet been devised for the synthesis of acetals, i. e., diethers of 1,1-glycols, containing nitrile groups in the molecule. The common procedure hitherto employed for the preparation of acetals consists in reacting aldehydes with alcohols under essentially anhydrous conditions in the presence of acidic catalysts such as hydrogen chloride. Nitriles under these same conditions, however, also react with alcohols to form iminoethers and, therefore, the application of this orthodox method for cyanoacetal manufacture from the corresponding aldehydo-nitrile intermediates is impractical.

This invention has as an object the provision of a process for the preparation of cyanopropionaldehyde acetals. Other objects will appear hereinafter.

These objects are accomplished by the following invention wherein a mixture of carbon monoxide and hydrogen is reacted in the presence of a hydrogenation catalyst with a mixture comprising acrylonitrile and a saturated alcohol, preferably in the chemical proportion whereby at least two alcoholic hydroxyls are present for each ethylenic bond of the acrylonitrile. The products have the formula $(R'O)_2$—$CH_2CH_2CN$ wherein the R' groups are both alkyl or together form an alkylene radical. The invention is carried out by heating the reactants at reaction temperatures and pressures within the range of 80–300° C. and above 20 atmospheres with a hydrogenation catalyst, preferably one selected from the metals of VIIIth group of the periodic table. Cobalt and ruthenium catalysts are particularly effective.

A more specific and preferred practice of the invention comprises reacting a mixture of carbon monoxide and hydrogen in the presence of a cobalt hydrogenation catalyst with a mixture comprising acrylonitrile and an alkanol of one to four carbon atoms. The preferred temperature lies between 100 and 200° C. With acrylonitrile pressures of 75–150 atmospheres do not give the desired result and pressure of 600 atmospheres or higher, e. g., 1200 atmospheres are employed.

The more detailed practice of the invention is illustrated by the following examples wherein parts are given by weight unless otherwise specified.

Example I

Into a silver-lined high pressure reaction vessel of 400 cc. capacity was charged 75 parts of acrylonitrile, one part of tertiary-butylcatechol, ten parts of a reduced cobalt-thoria catalyst (100 parts cobalt-18 parts thoria, 200 parts kieselguhr) and 120 parts of methanol. The vessel was then closed and pressured to 230 atmospheres with hydrogen, then to 400 atmospheres with carbon monoxide and heated with shaking at 150° C. for one hour, during which period the pressure was maintained between 600 and 900 atmospheres with carbon monoxide.

At the end of this time the vessel was cooled and excess gas was bled off. The contents were discharged into a stripping still heated by xylene vapor as a heat exchange material and distilled. After removal of the methanol at atmospheric pressure, the product was distilled at the temperature of boiling xylene under pressures down to 1 mm. This latter fraction on redistillation in a precision still yielded 59 parts of cyanopropionaldehyde dimethyl acetal as a colorless oil boiling at 90–91° C./14 mm.

Analysis: Calculated for $C_6H_{11}NO_2$: C, 55.80%; H, 8.58%; N, 10.85%. Found: C, 55.64%, 55.51%; H, 8.69%, 8.66%; N, 10.72%, 10.90%.

Example II

The carbonylation process of the preceding example was repeated at 170° C. for eight hours with the same carbon monoxide-hydrogen ratio using, instead of cobalt-thoria, two parts of ruthenium dioxide with 75 parts of acrylonitrile, 120 parts of methanol, and two parts of hydroquinone in place of the tertiary-butylcatechol. There was thus obtained from this reaction 15.6 parts of the cyanopropionaldehyde dimethyl acetal described above.

Example III

In order to illustrate the flexibility of the carbon monoxide-hydrogen ratios, the apparatus described in Example I was charged with 60 parts of acrylonitrile, 120 parts of methanol, two parts of hydroquinone, and ten parts of cobalt-thoria catalyst. The vessel was then closed, pressured to 230 atmospheres with carbon monoxide then to 400 atmospheres with hydrogen and heated one hour at 175° C. with agitation during which period the vessel was repressured with hydrogen to maintain the pressure between 800 to 1,000 atmospheres. Following a work-up as described above there was obtained 25 parts of cyanopropionaldehyde dimethyl acetal distilling at 89–90° C./12 mm.

Example IV

Ethylene glycol (110 parts) was substituted for the methanol (120 parts) in the process of Example I and with 75 parts of acrylonitrile, two parts of hydroquinone, and ten parts of cobalt-thoria catalyst was likewise reacted under the same carbon monoxide-hydrogen pressures. The reaction was carried out at 175° C. for one hour. Twelve parts of cyanopropionaldehyde ethylene acetal distilling at 71-75° C./6 mm.; $n_D^{21°\,C.}$ 1.4248, was obtained by distillation of the reaction mixture.

Although the process of the invention has been illustrated with methanol and ethylene glycol, it is, in general, applicable to saturated primary and secondary monohydric and dihydric alcohols, i. e., to alcohols having from one to two hydroxyls, the hydroxyls being on carbons attached to at least one hydrogen. Primary monohydric alcohols are preferred, particularly the alkanols of from one to four carbon atoms, i. e., methanol to the butanols. More particularly, methanol, ethanol, ethylene glycol, and the propylene glycols are preferred because of their availability and satisfactory reactivity. The unsaturated alcohols, such as allyl, methallyl and crotyl alcohols, have been found unsuitable as alcohol components for the production of acetals by the process of this invention. These alcohols, because of their rearrangement to aldehydes under the conditions of the process and because of the condensation of these aldehydes to high boiling and sometimes intractable products, are unsuitable.

In the process of this invention, the saturated hydroxylic reactant, for example, an alkanol or alkanediol, is preferably present in a chemical proportion of at least two active hydroxyls per mol of acrylonitrile. Likewise, carbon monoxide should be employed in an amount such that it is at least molarly equivalent initially to the acrylonitrile being carbonylated, and although not absolutely essential, it is preferable, because in general of improved yields, to use molal excesses of carbon monoxide. For example, the molal ratio of acrylonitrile to carbon monoxide can vary from 1:1 to 1:20 or more, the preferred ratio being from 1:2 to 1:10. The molal ratio of carbon monoxide to hydrogen can range from about 1:2 to 2:1. In general, however, it is preferable to keep the molal ratio of the two gases at about 1:1. Mixtures of the saturated alcohols can also be used.

As already indicated the minimum pressure required to effect reaction is at least 600 atmospheres. The pressure required also depends on such factors as the nature of the alcoholic reactant, temperature, catalyst, etc. With acrylonitrile and methanol pressures of 75 to 150 atmospheres do not give the desired result and pressures in the range of 600 to 1200 atmospheres or higher are employed.

Hydrogenation catalysts, and particularly those comprising metals of the VIIIth group of the periodic table of elements, are suitable for the production of acetals by the process of this invention. More particularly, hydrogenation catalysts of cobalt and ruthenium are preferred. The effectiveness of these catalysts for the purpose of this invention may be enhanced by the addition of certain activators, e. g., the difficultly reducible metal oxides such as those of thorium, magnesium, chromium, and aluminum, such oxides being employed in an amount of from 5 to 150 per cent of the weight of the active hydrogenating metal. These hydrogenation catalysts are generally employed in excess of 0.1% (based on the weight of the acrylonitrile), and preferably between 1 and 15% since these amounts usually give the best results.

The products of this invention are useful as intermediates for the preparation of pharmaceuticals and dyestuffs, and as pest control agents.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A process which comprises heating, at reaction temperature within the range 100–200° C. and at a pressure of at least 600 atmospheres, acrylonitrile with, per mol of nitrile, at least two mols of an alkanol of one to four carbons, at least one mol of carbon monoxide and at least one mol of hydrogen in the presence of a cobalt hydrogenation catalyst, said alcohol being initially present in the amount of at least two mols per mol of nitrile.

2. A process which comprises reacting acrylonitrile with, per mol of nitrile, at least two mols of methanol, at least one mol of carbon monoxide and at least one mol of hydrogen at a temperature of 100–200° C. and a pressure of 600–1200 atmospheres in the presence of a cobalt-thoria hydrogenation catalyst, the methanol being initially present in the amount of at least two mols per mol of nitrile.

3. A process which comprises heating, at reaction temperature and pressure, within the range of 80–300° C. and 600–1200 atmospheres, and in the presence of a hydrogenating catalyst, acrylonitrile with, per mole of acrylonitrile, at least one mol of carbon monoxide, at least one mol of hydrogen and, initially present in the amount of at least two equivalents of hydroxyl per mol of acrylonitrile, a saturated aliphatic alcohol having hydrogen on carbinol carbon.

4. Process of claim 3 wherein the alcohol is an alkanediol.

5. Process of claim 3 wherein the alcohol is ethylene glycol.

6. Process of claim 3 wherein the catalyst is a ruthenium hydrogenation catalyst.

PAUL LATRELL BARRICK.
ALBERT ALAN PAVLIC.

REFERENCES CITED

The following references are of record in the file of this patent:

UNITED STATES PATENTS

| Number | Name | Date |
| --- | --- | --- |
| 2,437,600 | Graham et al. | Mar. 9, 1948 |